United States Patent
Baxter et al.

(10) Patent No.: US 6,651,066 B2
(45) Date of Patent: *Nov. 18, 2003

(54) CONTENT MANAGEMENT SYSTEM

(75) Inventors: Sarah Baxter, Alexandria, VA (US); Lisa C. Vogt, Bethesda, MD (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/092,438

(22) Filed: Mar. 8, 2002

(65) Prior Publication Data

US 2002/0198878 A1 Dec. 26, 2002

Related U.S. Application Data

(62) Division of application No. 09/222,831, filed on Dec. 30, 1998, now Pat. No. 6,356,903.

(51) Int. Cl.[7] .............................................. G06C 17/30
(52) U.S. Cl. ...................................................... 707/10
(58) Field of Search ............................. 707/1, 10, 101; 709/219

(56) References Cited

U.S. PATENT DOCUMENTS

| | | | |
|---|---|---|---|
| 5,767,848 A | 6/1998 | Matsuzaki et al. | 345/331 |
| 5,793,972 A | 8/1998 | Shane | 709/219 |
| 5,864,871 A | 1/1999 | Kitain et al. | 707/104 |
| 5,894,554 A | 4/1999 | Lowery et al. | 395/200.33 |
| 5,913,215 A | 6/1999 | Rubinstein et al. | 707/10 |
| 6,016,504 A | 1/2000 | Arnold et al. | |
| 6,026,430 A | 2/2000 | Butman et al. | 709/203 |
| 6,044,205 A | 3/2000 | Reed et al. | 709/201 |
| 6,141,653 A | 10/2000 | Conklin et al. | 705/80 |
| 6,356,903 B1 * | 3/2002 | Baxter et al. | 707/10 |
| 6,466,970 B1 * | 10/2002 | Lee et al. | 709/217 |
| 6,489,980 B1 * | 12/2002 | Scott et al. | 345/854 |

* cited by examiner

Primary Examiner—Diane D. Mizrahi
(74) Attorney, Agent, or Firm—Staas & Halsey LLP

(57) ABSTRACT

A content management system for information delivery systems, including web based systems, that organizes the content of the information separately from the appearance of the presented information. The pages of the information are organized into documents and borders. Each border and document is further divided into an outline, organizing the content, and a template organizing the appearance. Individual content is stored in a native format enabling creators and maintainers to use familiar software tools for creation and maintenance. When retrieving the information, an assembly process gathers the content in accordance with the document's outline and formats the content in accordance with the document's template. The data structure allows triggers to be associated with content such that automated maintenance procedure can be implemented based on the activation of the triggers.

6 Claims, 11 Drawing Sheets

CONTENT MANAGEMENT SYSTEM

This application is a divisional of application No. 09/222,831, filed Dec. 30, 1998, now issued as U.S. Pat. No. 6,356,903.

BACKGROUND OF THE INVENTION

1. Field of the Invention

The present invention is directed to a system including apparatus, software and methods for organizing content from a variety of sources to be presented in a unified manner such as on a Web page.

2. Description of the Related Art

The World Wide Web ("WWW") has quickly become the vehicle for delivery of information inside and outside of organizations. Inside organizations Intranets deliver information to workers in an easily accessible manner. Outside organizations the Internet delivers information to the public at large. Information is delivered in units referred to herein as content. Content is basically any item (in whatever size or demarcation is most useful) of information, be it textual, graphical, audio, executable, or otherwise delivered to a user or viewer. Content is delivered by "web servers" in pages using embedded formatting tags readable by programs called "browsers."

In general, content on the WWW is created and maintained manually either by a dedicated "Web Master" or by some knowledgeable person in his or her spare time. While some attempts have been made to automate the creation and maintenance of web pages, these attempts have been limited. Currently, there exists no system for creating and managing content on the WWW that enables content creators, such as graphic artists, copy writers, programmers, and editors, to create content for the web using tools with which they are familiar and not have to worry about integration of their content into Web pages. Further, no current system places content into a structure which enables automated management.

SUMMARY OF THE INVENTION

It is an object of the present invention to provide a content management system that allows content creators to work on specific pieces of content with familiar tools while maintaining the content in a format native to such tools.

It is yet another object of the present invention to provide a content management system that facilitates the separation of tasks into logical units.

It is yet another object of the present invention to provide a content management system that places content into a logical data structure separate from organizational and formatting components simplifying maintenance.

It is another object of the present invention to provide a data repository that facilitates retrieval and modification of information.

It is another object of the present invention to provide an automated content management system for web sites that facilitates creation and maintenance thereof.

It is yet another object of the present invention to provide a content management system that facilitates dynamic real time creation of web type pages.

The above objects can be obtained by a content management system comprising: a repository separately storing content, an organizational component of the content and a format component of the content; and a content management system server that accesses the organizational component of the content and creates a display of the content based on the organizational component in accordance with the format component of the content.

The above objects can also be achieved in a content management system for dynamically creating world wide web pages comprising: a repository separately storing content for the web pages, an organizational component of the content and a format component of the content; and a content management system server that receives a request from a web server for a web page and, in real time, accesses the organizational component of the content and creates a web page for the content based on the organization component in accordance with the format component of the content.

The above objects can also be achieved in a method of dynamically creating a webpage from existing content comprising: storing content of the web page in a format native to the tools used to create the content; storing a separate format component of the web page indicating how to display the web page; storing a separate outline of the web page indicating a hierarchy of the content on the web page and the format component for the web page; and when requested assembling the web page, in real time, by accessing the outline of the web page, retrieving the content and format component referenced in the outline, organizing the content based on the outline of the web page and formatting the content based on the format component.

The above objects can also be achieved in a computer-readable medium encoded with a data structure for a content management system separating content from an organizational component and a format component thereof, the data structure comprising: a table indexing sites to a site ID; a table indexing a document to the site ID using a document ID; a table indexing an outline to document ID using an outline ID; a table indexing at least one section to an outline ID using a section ID; a table indexing content to each section ID; and a table indexing a formatting component to an outline ID.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
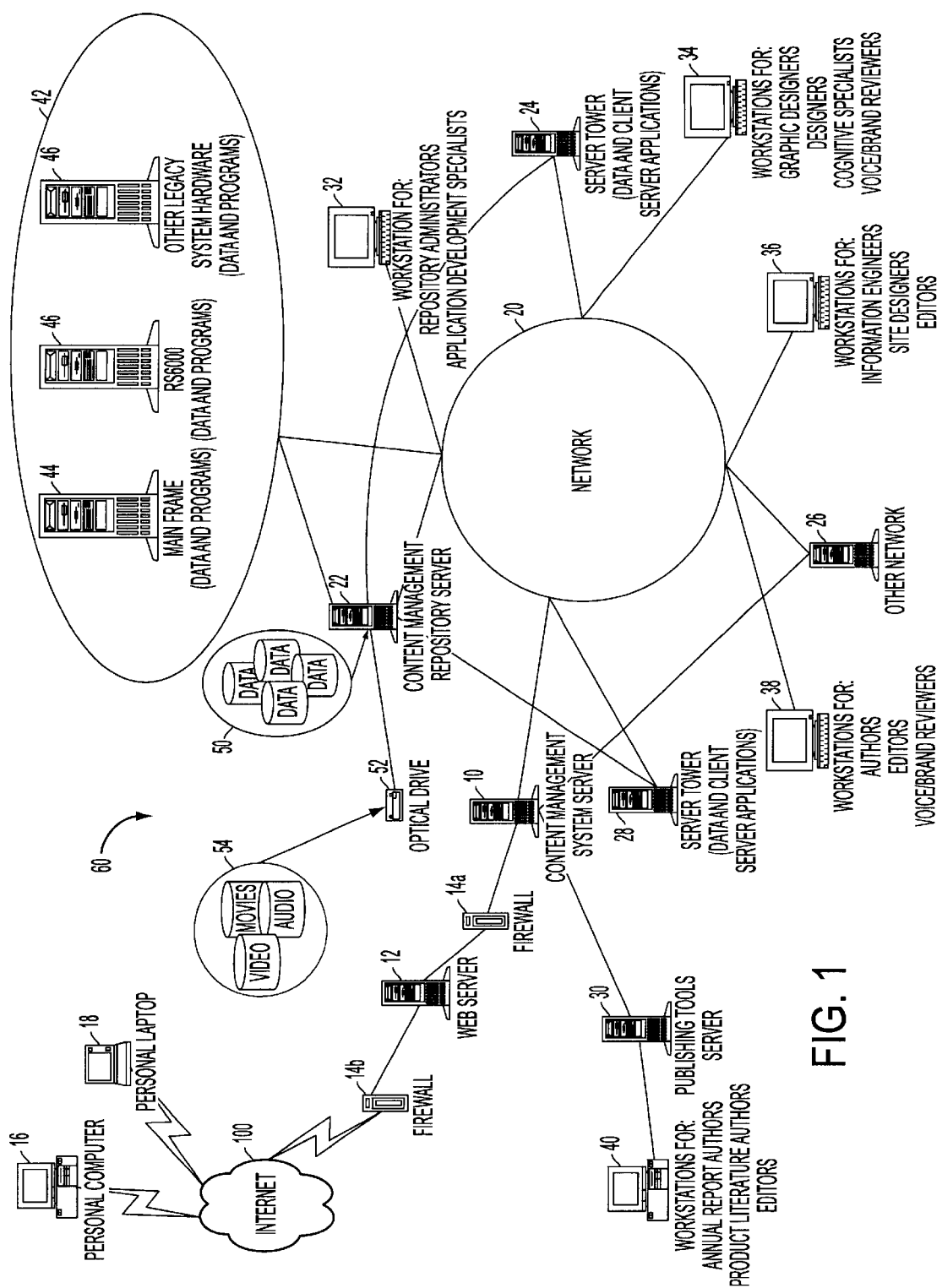
FIG. 1 is a block diagram of a web based content management system in accordance with a preferred embodiment of the present invention.

Reference will now be made in detail to the preferred embodiment of the present invention, examples of which are illustrated in the accompanying drawings, wherein like reference numerals refer to like elements throughout.

The detailed description which follows is presented in terms of general procedures and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines " and "programs."

In general, the sequence of steps in the procedures require physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits," "values," "elements," "symbols," "characters," "images," "terms," "numbers," or the like. It should be recognized that these and similar terms are to be associated with the appropriate physical quantities and are merely convenient labels applied to these quantities.

In the present case, the procedures are machine operations performed in conjunction with other machines and possibly human operators. Useful machines for performing the operations of the present invention include general purpose digital computers, routers, switches, and other similar devices. In general, the present invention relates to method steps, software, and associated hardware configured to process electrical or other physical signals to generate other desired physical signals.

The apparatus set forth in the present application may be specifically constructed for toe required purposes or it may comprise a general purpose computer or terminal selectively activated or reconfigured by a computer program stored in the computer. The procedures presented herein are not inherently related to any particular computer or other apparatus. In particular, various general purpose machines may be used with programs in accordance with the teachings herein, or it may prove more convenient to construct more specialized apparatus to perform the required method steps.

However, one of ordinary skill in the art will recognize that there exists a variety of platforms and languages for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a solid understanding of web servers, hyper text markup language (HTML) or other markup language, database structures and the ability to program general database systems as well as create web pages and CGI scripts. It being recognized that such practitioners do not require specific details of the software, but rather find data structure descriptions and process descriptions more desirable (due to the variety of suitable hardware and software platforms), such specifics are not discussed to avoid obscuring the invention.

FIG. 1 is a block diagram of a web based content management system in accordance with a preferred embodiment of the present invention. The system shown in FIG. 1 is particularly suited to delivery of web pages over the Internet 100 (or an Intranet (not shown)). It should be noted that there exist competing systems for delivery of information that use hypertext links or other mechanisms similar to the facilities provided by HTML (and XML) used in the WWW. For simplicity, only the WWW is discussed herein, but those of ordinary skill in the art will recognize the applicability of the present invention to such systems. For example, the invention discussed herein is suited for use with a variety of information delivery systems including a variety of document management systems and training systems.

A key feature of the present invention is that content and the content's organization and format are separably stored and maintained for subsequent real time assembly. This allows the content creation function to be separated from the content design function, thereby simplifying the maintenance function. Generally, the information of a web page is referred to as content (including text, graphics, programs, etc. . . . ). In accordance with the preferred embodiment of the present invention, the organization of the content is stored in an organizational components (for example, an outline) and the format of the content is stored in format components (for example templates and styles). Both the organizational components and the format components are stored separately from the raw content. A content management system server 10 runs an assembly procedure, discussed hereinafter, to deliver requested content in a prescribed organization and format to end users utilizing computing devices, such as a personal computer 16 or a laptop 18. The organized and formatted content served by the content management system server 10 is provided to the Internet via a web server 12. Optional firewalls 14a and 14b can be, utilized to provide security. The content management system server 10 retrieves the organizational components, format components and content from a variety of sources, either directly connected to the content management system server 10 or via a network 20. Generally speaking, the organizational and format components, along with the content are stored in a repository and accessed via an index discussed hereinafter.

As used herein, content comes from content creators and is presented in a format and arranged in an organization determined by content designers. Content creators include: authors, programmers, editors, and artists. Content designers include: graphic artists, web designers and programmers. Programs, such as JAVA applets are considered content and treated the same as any other content. Once created, content making up the web pages is maintained by managers in conjunction with the content creators and designers. Using this structure, the present invention divides the various tasks of creating and maintaining web page content into logical units. This allows anything transmitted or used by an end user to be considered content and to be governed by format rules.

A content management repository server 22 handles storing, serving and maintaining content and in conjunction with the various storage devices acts as a repository 60. The content management repository server 22 can also store and serve the organizational and format components. The content management repository server 22 maintains an index cross-referencing content, formatting components and organizational components allowing the content to be stored on a variety of devices. FIG. 1 shows an optical drive 52, storing video, movies, and audio, as well as a traditional data storage unit 50 being directly connected to the content management repository 22. A variety of larger systems 42, including: a mainframe 44; an RS6000 46; and other devices 48, are shown as being either directly connected to the content management repository 22 or being connected through the network 20. Other servers, such as server towers 24, 26 and 28 may be added to handle a variety of content as shown in FIG. 1. The content management repository 22 also maintains an index of the location of the content, format, components, and organizational components and serves the requested documents to the content management system server 10 upon request.

A variety of workstations 32, 34 and 38 are connected to the network 20 for creating and updating the content as shown in FIG. 1. Generally, content is stored in its native format to enable content creators easy access to the content for maintenance and/or modification. Accordingly, word processing documents are stored in, for example, WORD® or WORDPERFECT® format while graphics are stored in the preferred format of the creator, for example, AUTOCAD, PHOTOSHOP, or COREL formats. Creators can retrieve and modify their content through the back end and not be concerned with presentation or serving of the content. Access to the content can be controlled by the content management system server or any other appropriate mechanism.

Figure 2:
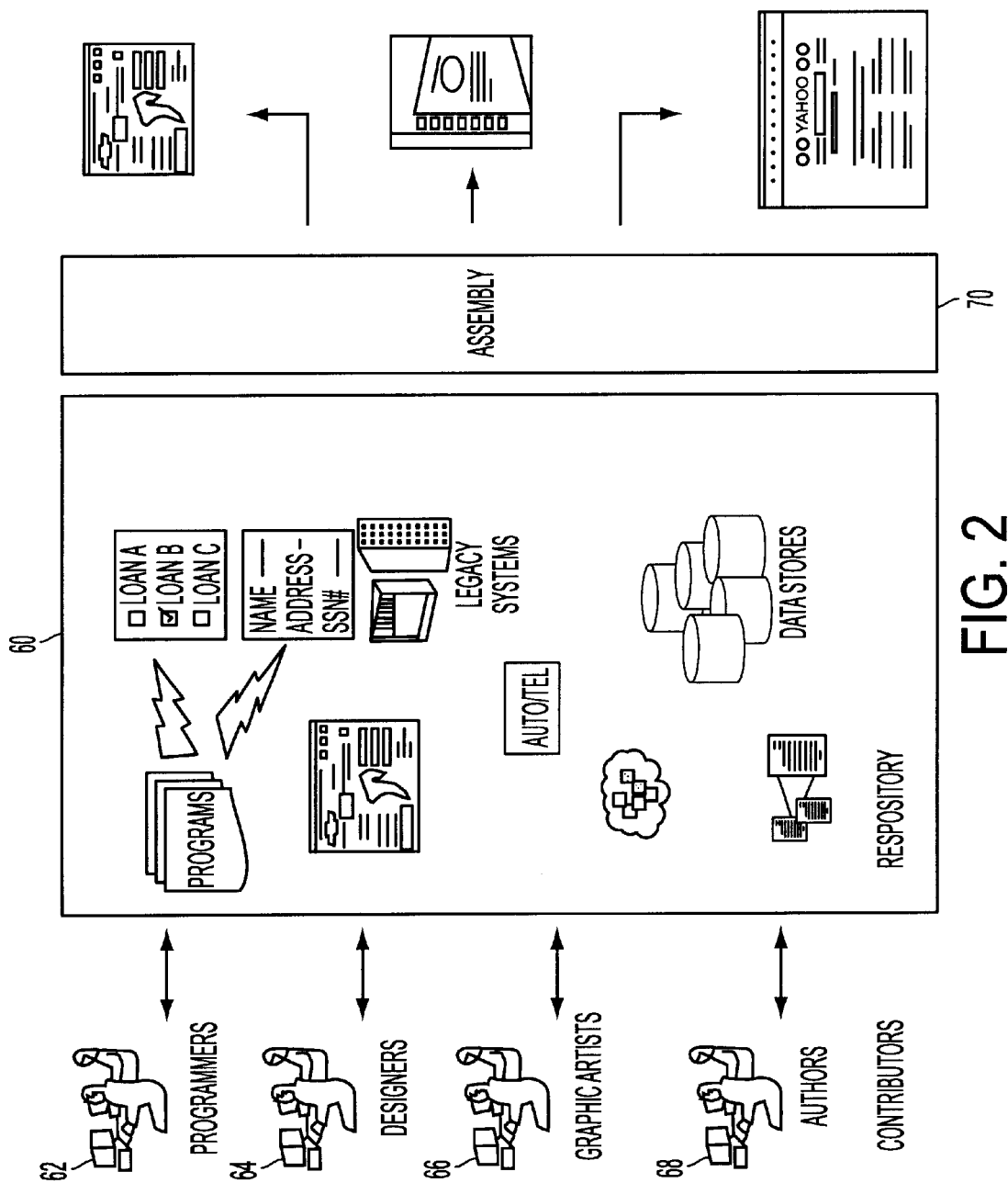
FIG. 2 is a conceptual diagram of a web based content management system in accordance with the preferred embodiment of the present invention.

FIG. 2 is a conceptual diagram of a web based content management system in accordance with the preferred embodiment of the present invention. The repository 60 is central to the content management system and acts as a database, or group of databases, storing content (or pointers thereto) along with organizational and format components (discussed hereinafter) for the display of content. A variety of users access the content, organizational components and format components for which they are responsible. Such users, collectively called contributors, include programmers 62; designers 64; graphic artists 66; and authors 68. Generally, creators create and edit all forms of content (programs, text, graphics, charts, audio, video, etc.), while designers design the both the look and feel components of the client interface as well as overall format. Such organizational and format components take the form of outlines and associated templates and section layouts discussed hereinafter.

The content and format stored in the repository 60 are assembled by an assembly procedure 70 prior to being served to end users as web pages.

Figure 3:
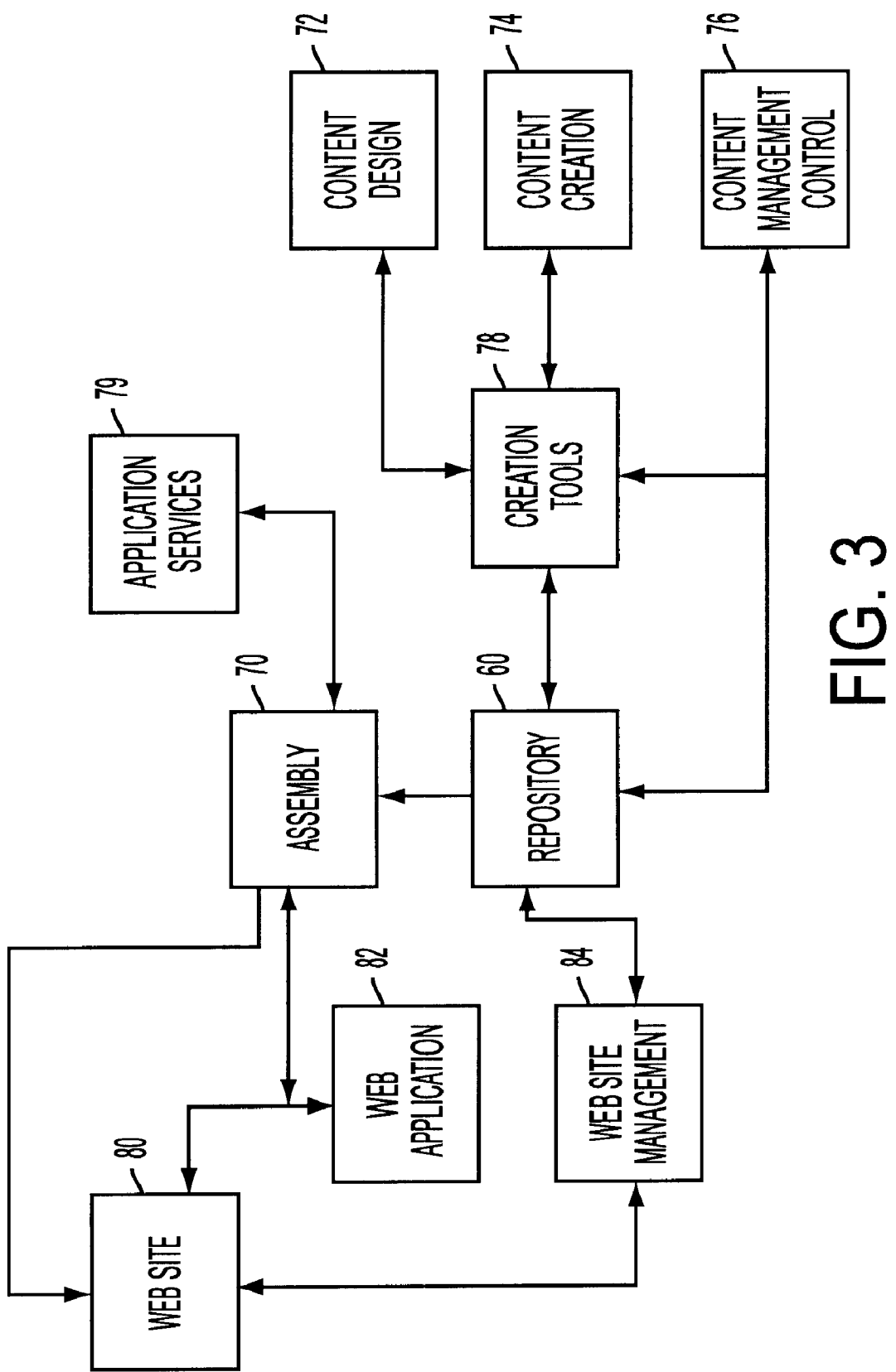
FIG. 3 is a block diagram of the web based content management system shown in FIG. 2.

FIG. 3 is a block data flow diagram of the web based content management system shown in FIG. 2. Content design processes 72 and content creation processes 74 utilize creation tools 78 to create content and format components which are stored in the repository 70.

A content management control processes 76 employs triggers (discussed hereinafter) for automated update processing and generally handles management and update of the content. If the content is an executable, such as with some Java applets or CGI scripts, an application services procedure 79 is provided to handle services related thereto.

The assembly procedure 70, in response to requests, pulls the content and format components from the repository 60 and provides assembled web pages to a web site 80. A web application 82, typically residing on a web server, acts as an interface. Web site management is a business function that typically works between the web site 80 and the repository 60 to ensure that content and format are updated in an appropriate manner.

Figure 4A:
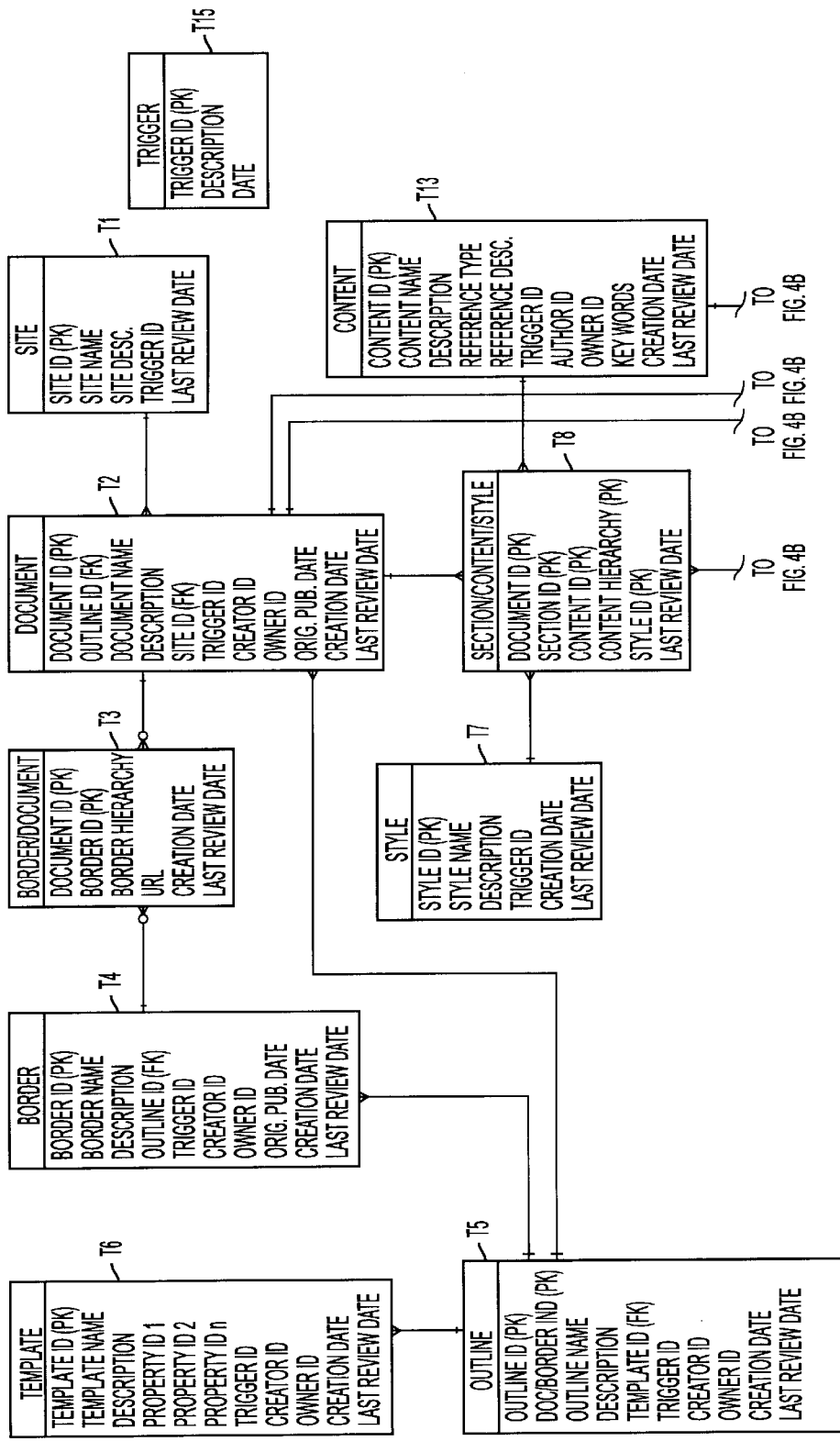
FIGS. 4A–B is a data structure for a web based content management system in accordance with the preferred embodiment of the present invention.
Figure 4B:
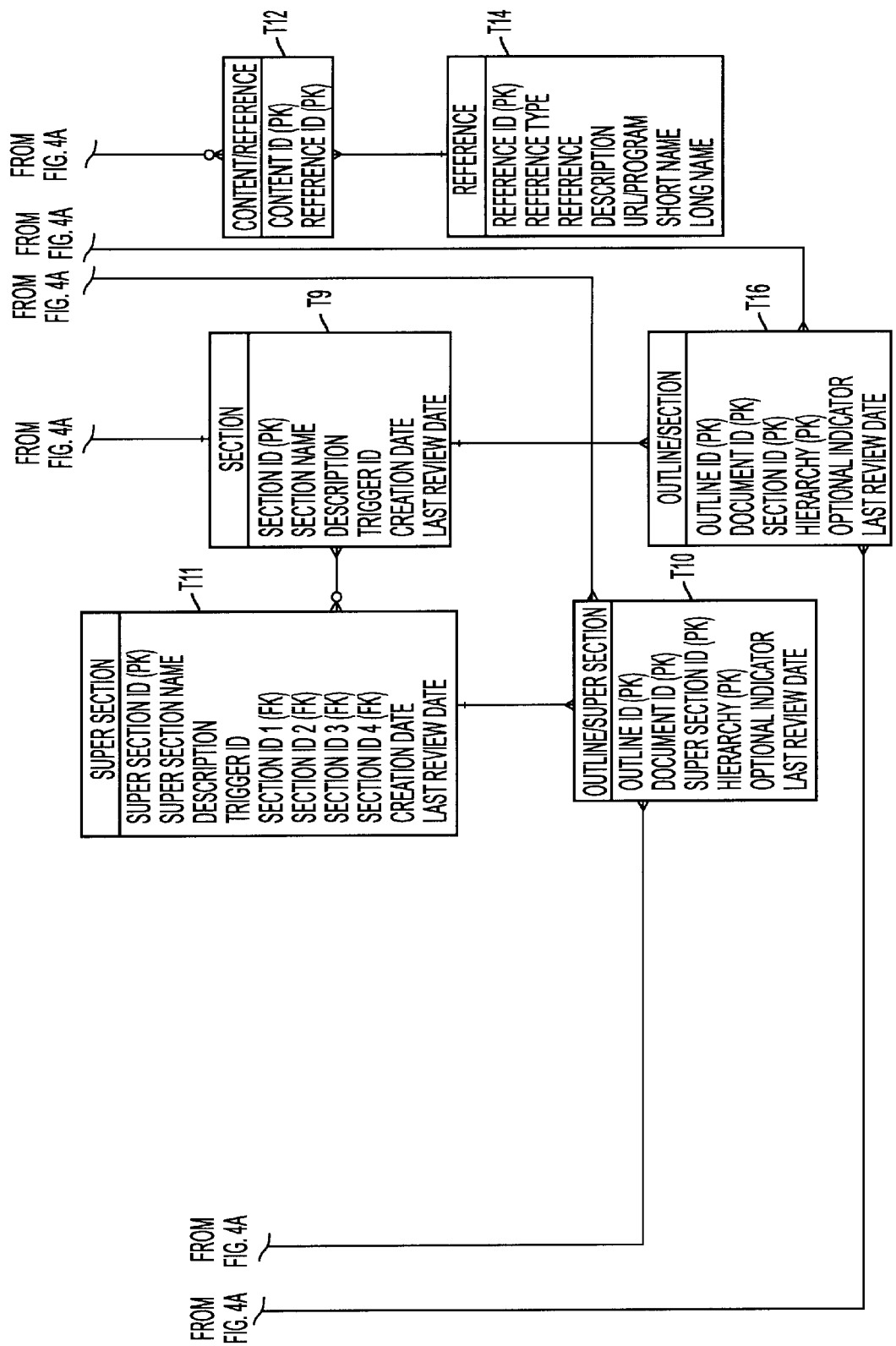

FIG. 4 is an example of a data structure that may be used for a web based content management system in accordance with the preferred embodiment of the present invention. This data structure will have to be modified for other types of information delivery services. Basically, a site (such as a web site) is divided into documents and borders. Borders are a WWW convention in which content on the edge of a page, typically navigational aids, is repeated for each page using the border. Each document is structured based on an outline. Sections are elements within each outline referencing content (or other sections) and may be reused within outlines. Each outline may also have associated triggers that will initiate a review of the outline. Each outline will have a template associated therewith to provide a format for content on the outline. Each section may further have a style associated therewith for additional specific formatting options.

An example of a newsletter outline is shown below:

Header

Title

AbstractBody
   Section 1
     Section 1.1 (optional)
       Section 1.1.1 (optional)
   Section 2 (optional)
     Section 2.1 (optional)
   Section 3 (optional)
     Section 3.1 (optional)

Links to Related Topics (optional)

Footer

As outlines are separate from content and format, one outline may be re-used by many documents. Thus, when adding new pages, if several documents exist within the content management system, an outline for a new document may already exist, simplifying the creation process. However, for entirely new documents, an outline and template will need to be created.

Further, if an existing outline is similar to the document under consideration, in some cases the outline can be modified to maximize re-use without affecting existing documents. This may be accomplished by designating some sections as optional (as shown above). For example, in the above described newsletter outline, three major sections exist, if a new document requires four major sections, a new optional, section may be added to the outline without affecting existing newsletters utilizing this outline.

The data structure shown in FIG. 4 ties together documents, outlines, styles, and templates and styles for use by the assembly procedure 70. Tables 1 through 16 describe the data structure shown in FIG. 4 for the content management system in detail.

TABLE 1

| Table Name | Table Description |
| --- | --- |
| T1: Site | This table defines the sites in the content management system. A site can be made up of one or more related pages. |

| Attribute | Attribute Description |
| --- | --- |
| Site ID (PK) | Unique identifier for each site. |
| Site Name | Name of each site. |
| Site Description | Textual description of each site. |
| Trigger ID (FK) | Unique identifier for each trigger. |
| Last Review Date | Metadata kept for each site indicating the last time the site was reviewed for accuracy and consistency. |

By utilizing such a data structure, "trigger" entries can be associated with each piece of the site. Triggers are conditions which initiate some form of maintenance action, such as notification e-mails or automatic update of content. Triggers are discussed more completely herein below.

TABLE 2

| Table Name | Table Description |
| --- | --- |
| T2: Document | Entity defines the allowed values for documents. A document is a publication such as a homepage, newsletter, interview transcript, product documentation, proposals, advertising, annual reports, etc . . . A document, when combined with one or more borders, makes up one or more web pages. |

| Attribute | Attribute Description |
| --- | --- |
| Document ID (PK) | Unique identifier for each document. |
| Outline ID (FK) | Unique identifier for each outline. |
| Document Name | Name of each document. |
| Description | Textual description of each document. |
| Site ID (FK) | Unique identifier for each site. |
| Trigger ID (FK) | Unique identifier for each trigger. |
| Creator ID | Metadata kept for each row indicating the initial creator of the document. |
| Owner ID | Metadata kept for each row indicating the owner of the document. |
| Orig. Pub. Date | Metadata kept for each row indicating the initial publication date. |
| Creation Date | Metadata kept for each row indicating the initial creation date. |
| Last Review Date | Metadata kept for each row indicating the last title this document was reviewed for accuracy and consistency. |

TABLE 3

| Table Name | Table Description |
| --- | --- |
| T3: Border/Document | Entity identifies borders and documents that make up a web page. |

| Attribute | Attribute Description |
| --- | --- |
| Document ID (PK) | Unique identifier for each document. |
| Border ID (PK) | Unique identifier for each border. |
| Border Hierarchy | Numeric representation defining a border's sequence within a document. |
| URL | URL which identifies the web page where the border/document combination are displayed. |
| Creation Date | Metadata kept for each border/document indicating the initial creation date. |
| Last Review Date | Metadata kept for each row indicating the last time this border/document combination was reviewed for accuracy and consistency. |

TABLE 4

| Table Name | Table Description |
| --- | --- |
| T4: Border | Entity defines the allowed values for borders. A border (usually defining navigation) can be horizontal or vertical. Multiple borders can appear on one page. |

| Attribute | Attribute Description |
| --- | --- |
| Border ID (PK) | Unique identifier for each border. |
| Border Name | Name of each border. |
| Description | Textual description of each border. |
| Outline ID (FK) | Unique identifier for each outline. |
| Trigger ID | Unique identifier for each trigger. |
| Creator ID | Metadata kept for each row indicating the initial creator of the border. |
| Owner ID | Metadata kept for each row indicating the owner of the border by user id. |
| Orig. Pub. Date | Metadata kept for each border indicating the initial publication date. |
| Creation Date | Metadata kept for each border indicating the initial creation date. |
| Last Review Date | Metadata kept for each row indicating the last time this border was reviewed for accuracy and consistency. |

Like a document, a border is comprised of an outline and a template. In addition to analysis of its components, the border will be assessed as a whole, and one or more "triggers" may be assigned (discussed in detail below).

In addition to triggers, each border will be analyzed based on outline and template. The outline specifies the content, while the template specifies the look and feel.

TABLE 5

| Table Name | Table Description |
| --- | --- |
| T5: Outline | Entity defines the allowed values for outlines. The structure of each document and border is based on an outline. |

| Attribute | Attribute Description |
| --- | --- |
| Outline ID (PK) | Unique identifier for each outline. |
| Doc/Border Ind (PK) | Indicator defines if an outline is for a document or border. "B" = border, "D" = document. |
| Outline Name | Name of each outline. |
| Description | Textual description of each outline. |
| Template ID (FK) | Unique identifier for each template. |
| Trigger ID | Unique identifier for each trigger. |
| Creator ID | Metadata kept for each row indicating the initial creator of the outline. |
| Owner ID | Metadata kept for each row indicating the owner of the outline by user ID. |
| Creation Date | Metadata kept for each row indicating the initial creation date. |
| Last Review Date | Metadata kept for each row indicadng the last time this outline was reviewed for accuracy and consistency. |

The document/border indicator used within the outline table T5 addresses a rule that 1) a border must use one outline; 2) a document must use one outline and 3) borders and documents will not use the same outline. To separate document outlines from border outlines without creating separate outline tables, the document/border indicator was used. The valid entries for this field are B for border and D for document.

TABLE 6

| Table Name | Table Description |
| --- | --- |
| T6: Template | Entity defines the allowed values for templates. A template is a set of properties that are applied at an outline level. |
| Attribute | Attribute Description |
| Template ID (PK) | Unique identifier for each template. |
| Template Name | Name of each template. |
| Description | Textual description of each template. |
| Property ID 1 | Unique identifier which defines a global property for the template. i.e. background color. |
| Property ID 2 | Unique identifier which defines a second global property for the template. i.e. background color. |
| Property ID n | Unique identifier which defines additional global properties for the template. i.e. background color. (Note that in a large-scale repository n properties would be required for a template.) |
| Trigger ID | Unique identifier for each trigger. |
| Creator ID | Metadata kept for each row indicating the initial creator of the template. |
| Owner ID | Metadata kept for each row indicating the owner of the template. |
| Creation Date | Metadata kept for each row indicating the initial creation date of the template. |
| Last Review Date | Metadata kept for each row indicating the last time the template was reviewed for accuracy and consistency. |

A template describes the properties which apply to formatting an outline, such as margin, type face, type color, etc. . . . Theoretically, a template may contain an unlimited number of properties.

An example of a template for the newsletter example discussed above would be:

Background: Egg-shell white
Top Margin: ½"
Bottom Margin: ½"
Left Margin: ½"
Right Margin: ½"

TABLE 7

| Table Name | Table Description |
| --- | --- |
| T7: Style | Entity defines the allowed values for styles. Style defines how content will appear within a section of an outline. |
| Attribute | Attribute Description |
| Style ID (PK) | Unique identifier for a style. |
| Style Name | Common reference name for a style. |
| Description | Textual description of the contents of a style. |
| Trigger ID | Unique identifier for each trigger. |
| Creation Date | Metadata kept for each row indicating the initial creation date. |
| Last Review Date | Metadata kept for each row indicating the last time this style was reviewed for accuracy and consistency. |

The style table T7 describes the Style contained within each section/content combination. Generally, when the formatting of a section or content item varies from the formatting defined in the template, such differing formatting is handled with styles. When a section or content is allowed to have multiple types of formatting, then those types are defined as styles. The elements contained within a section/content combination are the styles that may be re-used. For example, a first-level section header may be re-used within the sample newsletter outline shown above for Section 1, Section 2, and Section 3. The style would define the header section as 14 point Arial. An example of the styles for the newsletter example is shown below.

Header: red, 18 point, courier
Title: black, 14 point, times roman
Abstract: black, 14 point, times roman
Body
    Section 1: black, 14 point, times roman
        Section 1.1: black, 14 point, times roman
            Section 1.1.1: black, 14 point, times roman
    Section 2: black, 14 point, times roman
        Section 2.1: black, 14 point, times roman
    Section 3: black, 14 point, times roman
        Section 3.1: black, 14 point, times roman
Links to Related Topics: green, 10 point courier, spaced ¼" apart
Footer: black, ½"×½" graphic

TABLE 8

| Table Name | Table Description |
| --- | --- |
| T8: Section/Content/Style | Entity defines the relationships of content within a section and the style applied to that content/section. |
| Attribute | Attribute Description |
| Document ID (PK) | Unique identifier for each document. |
| Section ID (PK) | Unique identifier for each section. |
| Content ID (PK) | Unique identifier for each piece of content. |
| Content Hierarchy | Sequence number indicates the order in which content is applied within a section. |
| Style ID | Unique identifier for a style. |
| Last Review Date | Metadata kept for each row indicating the last time this section/content/style instance was reviewed for accuracy and consistency. |

TABLE 9

| Table Name | Table Description |
| --- | --- |
| T9: Section | Entity defines the allowed values for sections. A section is a portion of an outline. |
| Attribute | Attribute Description |
| Section ID (PK) | Unique identifier for each section. |
| Section Name | Common reference name for each section. |
| Description | Textual description of each section. |
| Trigger ID | Unique identifier for each trigger. |
| Creation Date | Metadata kept for each row indicating the initial creation date. |
| Last Review Date | Metadata kept for each row indicating the last time the section was reviewed for accuracy and consistency. |

TABLE 10

| Table Name | Table Description |
| --- | --- |
| T10: Outline/Super Section | Entity defines the relationships of super sections within an outline. |
| Attribute | Attribute Description |
| Outline ID (PK) | Unique identifier for each outline. |
| Document ID (PK) | Unique identifier for each document. |
| Super Section ID (PK) | Unique identifier for each super section. |
| Optional Indicator | Mandatory or optional tag defines if a particular super section can be omitted from an outline. |
| Hierarchy | Sequence number indicates the order in which super sections are applied within an outline. |
| Last Review Date | Metadata kept for each row indicating the last time the outline/super section was reviewed for accuracy and consistency. |

TABLE 11

| Table Name | Table Description |
| --- | --- |
| T11: Super Section | Entity defines the allowed values for super sections. A super section is a grouping of sections, that is commonly re-used together. |
| Attribute | Attribute Description |
| Super Section ID (PK) | Unique identifier for each super section. |
| Super Section Name | Common reference name for each super section. |
| Description | Textual description of each super section. |
| Trigger ID | Unique identifier for each trigger. |
| Section ID 1 (FK) | Section one of the super section. It is first in the order of sections. |
| Section ID 2 (FK) | Section two of the super section. It is second in the order of sections. |
| Section ID 3 (FK) | Section three of the super section. It is third in the order of sections. |
| Section ID 4 (FK) | Section four of the super section. It is fourth in the order of sections. (Note: a large-scale model should allow for n sections within a super section.) |
| Creation Date | Metadata kept for each super section indicating the initial creation date. |
| Last Review Date | Metadata kept for each super section indicating the last time this record was reviewed for accuracy and consistency |

A super section is a collection of sections that will be re-used within one or more outlines. Theoretically, a super section may contain an unlimited number of sections. The super section table T11 uses section IDs 1 through 4 as example of foreign keys, to show the specific sections within a super section, and the hierarchy of the sections within the super section. In use this table would be expanded to allow for however many sections per super section are required.

TABLE 12

| Table Name | Table Description |
| --- | --- |
| T12: Content/Reference | Entity defines the relationships of references within content. |
| Attribute | Attribute Description |
| Content ID (PK) | Unique identifier for each piece of content. |
| Reference ID (PK) | Unique identifier for each reference. |

TABLE 13

| Table Name | Table Description |
| --- | --- |
| T13: Content | Entity defines the allowed values for content. Content is the actual text, graphics, sound, and animation etc. that appear on the website. |
| Attribute | Attribute Description |
| Content ID (PK) | Unique identifier for each piece of content. |
| Content Name | Common reference name for each piece of content. |
| Description | Textual description of each piece of content. |
| Reference Type | Allowed reference types include: pointers, links and modules. A pointer interfaces with another repository to provide content. A link is a connection to another WWW location. That location can be in the current site or another website. A module is a program which interacts with the content. |
| Reference Description | Textual description of each reference. |
| Trigger ID | Unique identifier for each trigger. |
| Author ID | Content creator's ID. |

TABLE 13-continued

| Table Name | Table Description |
| --- | --- |
| Owner ID | Metadata kept for each row indicating the owner of the content. |
| Key Words | Descriptive category tags applied to each piece of content. One to n number of tags will be allowed. |
| Creation Date | Metadata kept for each content item indicating the initial creation date. |
| Last Review Date | Metadata kept for each content item indicating the last time this record was reviewed for accuracy and consistency. |

The content items referenced within an outline are the actual text, graphics, sounds, animation, etc. that are published on the website. Each portion of content that may be re-used for a different document would be defined separately. For example, the footer portion of the outline may contain two pieces of content: the copyright date, and a corporate logo. The copyright or logo would be stored separately so that they may be re-used by any other document's outlines or sections.

A piece of content may be redefined as its uses evolve. For example, the first time a newsletter outline is analyzed, a three-paragraph portion of the body may be defined as a single piece of content. This may later be divided into three pieces of content if each paragraph can be re-used for separate purposes.

Content may have triggers associated therewith. For example, an hourly trigger that updates a customer's account balance throughout the business day would be automatically driven through an automated source. A monthly trigger could be defined that begins the process of updating the newsletter.

Content may also have a reference associated therewith. A reference is an entity defining the allowable values for reference. Generally, a content item may contain one or more references. Three types of reference are used in accordance with the preferred embodiment of the present invention: pointers, links, and modules. A pointer interfaces with another repository to provide content. For example, an individual's account balance would be moved from the operational accounts system into the content item for account balances. A link is a connection to another WWW location. That WWW location can be in the current site or another website. A module is a program which interacts with the content. A module may be an applet, a call to another program, etc. For example, when a person enters their birth day in a ID field, the data they enter will be checked using an edit program.

TABLE 14

| Table Name | Table Description |
| --- | --- |
| T14: Reference | Entity defines the allowed values for reference. Currently defined reference types include: pointers, links and modules. |
| Attribute | Attribute Description |
| Reference ID (PK) | Unique identifier for each reference. |
| Reference Type | Allowed reference types include: pointers, links and modules. A pointer interfaces with another repository to provide content. A link is a connection to another location. That location can be in the current site or another website. A module is a program which interacts with the content. |

TABLE 14-continued

| Table Name | Table Description |
| --- | --- |
| Reference Description | Textual description of each reference. |
| URL/Program | Lists the URL or the program name being called. |
| Short Name | One of two allowed text strings which can be used to highlight a reference. Option one is a short name. Names are defined to insure consistency. |
| Long Name | One of two allowed text string which can be used to highlight a reference. Option two is a long name. Names are defined to insure consistency. |

TABLE 15

| Table Name | Table Description |
| --- | --- |
| T15: Trigger | Entity defines the allowed values for triggers. A trigger indicates an event which would prompt a review. This event could be business related, time sequenced, or other, but would assist in keeping the data in the database up to date. |
| Attribute | Attribute Description |
| Trigger ID (PK) | Unique identifier for each trigger. |
| Description | Textual description of each trigger. |
| Date | Metadata kept for each trigger indicating the initial population date. |

A trigger indicates an event which would prompt a review. This event could be business related, time sequenced, or other, but would assist in keeping the data in the database up to date. Typically, tables that use triggers will require multiple triggers per record. For example, an outline will have multiple triggers. The example data structure shown in FIG. 4 accommodates more than one trigger for each record only through entering multiple triggers in the trigger field. The trigger table T15 actually has relationships to many other tables, however, for simplicity, it is shown off to the side of the data model.

TABLE 16

| Table Name | Table Description |
| --- | --- |
| T16: Outline/Section Table | Entity defines the relationships of sections and outline. |
| Attribute | Attribute Description |
| Outline ID (PK) | Unique identifier for each outline. |
| Document ID (PK) | Unique identifier for each document. |
| Section ID (PK) | Unique identifier for each section. |
| Hierarchy (PK) | Sequence number indicates the order in which sections are applied within an outline. |
| Option Indicator | Mandatory or optional tag defines if a particular section can be omitted from an outline. |
| Last Review Date | Metadata kept for each outline/section combination indicating the last time this record was reviewed for accuracy and consistency. |

The outline/Super Section table T10 and the outline/section table T16 capture the super sections used within an outline, and the hierarchy, or order, in which they appear. An outline may be made up of sections and/or super sections. To identify all sections and super sections within an outline, as well as their hierarchy, the outline/section table must also be referenced. The outline/section table shows sections used within an outline, and the hierarchy in which they appear.

Figure 5:
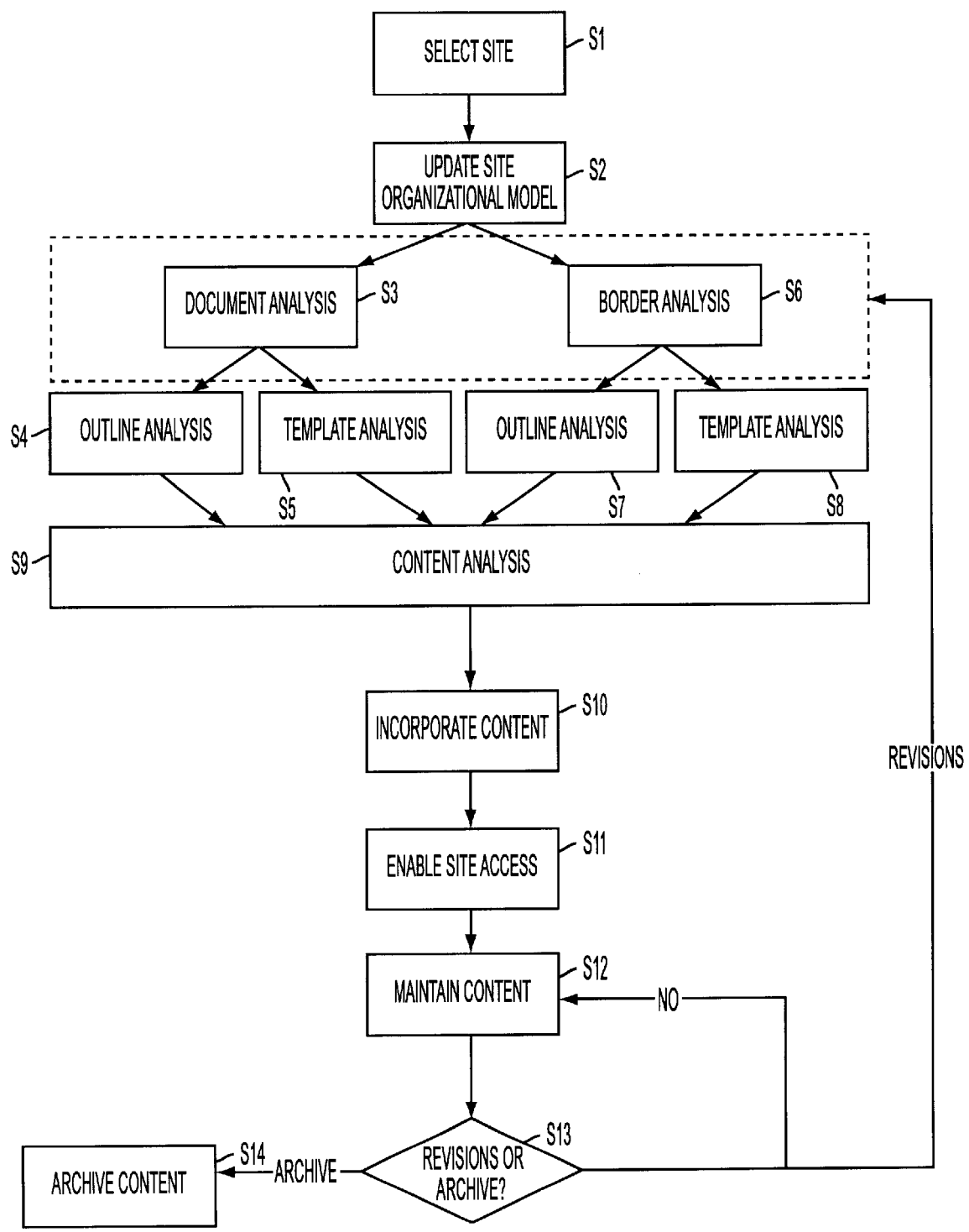
FIG. 5 is a flow chart for the migration of existing content to the content management system in accordance with the preferred embodiment of the present invention.

FIG. 5 is a flow chart for the migration of existing content to the content management system in accordance with the preferred embodiment of the present invention. The process starts in step S1 with an identification of a site to add to the content management system, i.e., catalog in the data structure shown in FIG. 4 by creating outlines, templates, styles, etc. . . .

Thereafter, in step S2 the current site organization model is updated. This step involves breaking the website down into documents and borders. The model will be created when the first document is analyzed, and will become more detailed as other documents are considered.

Figure 6:
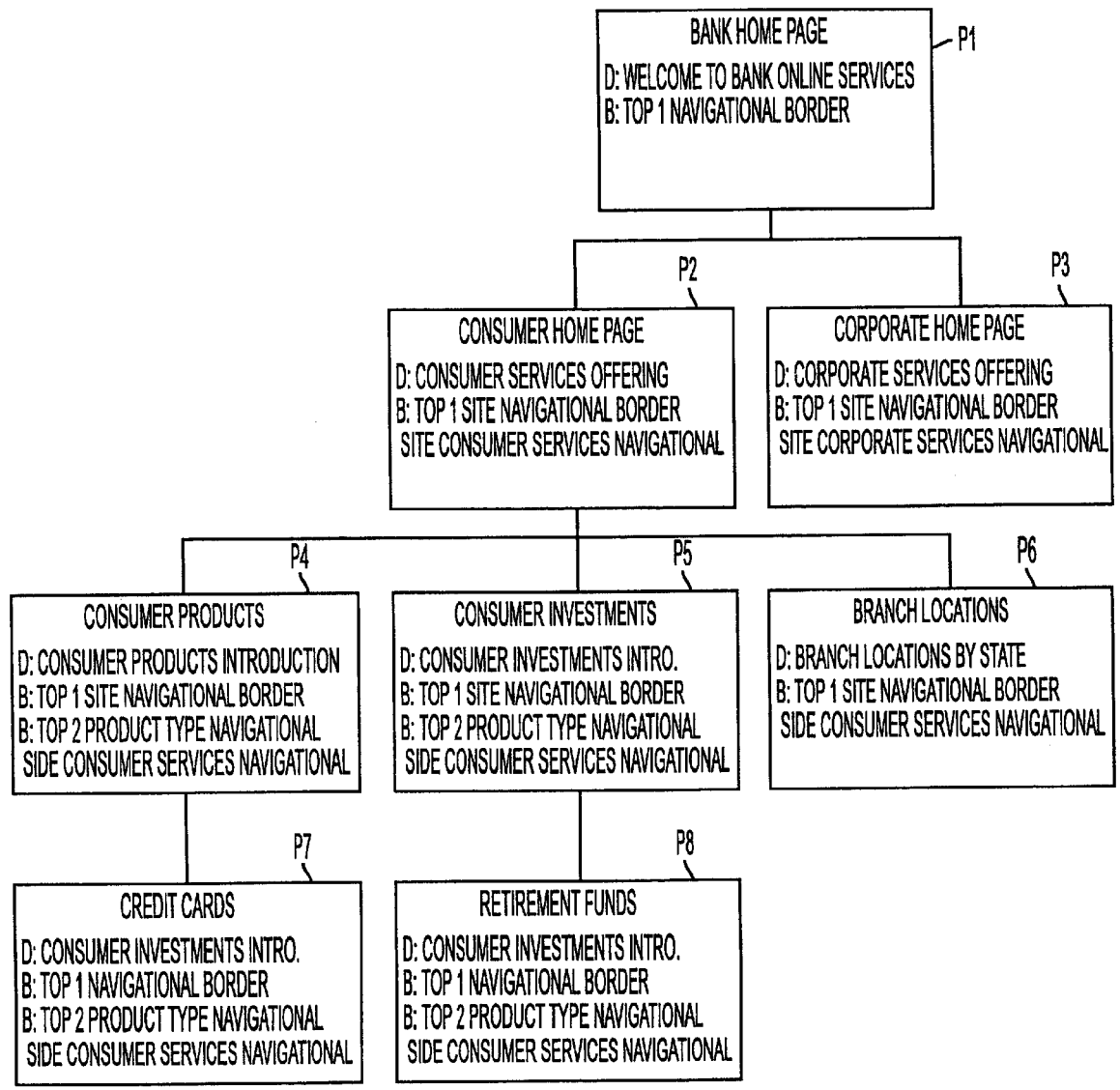
FIG. 6 is an example of a website organizational model.

FIG. 6 is an example of a website organizational model for a bank website. The model describes documents P1 through P8. The website organizational model does not necessarily represent each web page in the bank's site. It is assumed that a site map that catalogs each page and how to navigate through them already exists for the website. If a site map does not exist, one should be developed.

The documents are current or candidate site publications such as home pages, newsletters, interviews, or an annual report. As set forth above, documents are comprised of at least one outline which in turn has a corresponding template. Borders are shown on the perimeter of the webpages and typically provide navigational links to other pages within the website or the world-wide web. Borders also display content that is used to convey a consistent image or message. As discussed above, each border is comprised of at least one outline with a corresponding template.

Each box on the website organization chart represents a unique combination of a document and zero, one, or more borders. A document or border may be shown on one or more web pages on the website.

Referring once again to FIG. 5, in steps S3 and S6 documents and borders in the website are analyzed. Specifically, outlines and templates are created for each document and border in steps S4, S5, S7, and S8. Each document and border is analyzed to generate an outline and a template. Examples of appropriate formats for outlines and templates are discussed hereinafter. The outline specifies the content, while the template specifies the look and feel. During the analysis, the following components will be identified for each document:

Outline and associated Template;

Sections and associated Style Group/Style; and

Content.

If several documents have already been analyzed, an outline for the document currently under consideration may already have been stored and can be reused. However, if the organization is in the early stages of developing the content management system, an outline and template will need to be created for each document. If an existing outline is very similar to the document under consideration, in some cases the outline can be modified to maximize re-use without affecting the existing documents. This will be done through designating some sections as optional. For example, if a document contained a header and a body with listings of multiple items, this would not fit the example newsletter outline previously discussed, and would warrant creation of its own outline.

The elements contained within an outline are the sections that may be re-used within the same outline or by other outlines. Sections can be grouped together to form super sections which can be accessed as a whole.

If a section or content is allowed to have multiple types of formatting, then those types are defined as styles. The elements contained within a section/content combination are the styles that may be re-used. For example, a first-level section header may be re-used within the sample newsletter outline shown above for Section 1, Section 2, and Section 3.

Like a document, a border is comprised of an outline and a template. Accordingly,; border analysis in steps S6, S7 and S8 are performed similar to the document analysis discussed above.

Content analysis is performed in step S9. The contents contained within an outline are the actual text, graphics, sounds, animation, etc. that are published on the website. Each portion of content that may be re-used for a different document should be defined separately.

Content from sources which are automated may be defined with automated triggers that cause an automatic update of the content, while content from manual sources may be defined with manual triggers providing notices that initiate manual updating. For example, an hourly trigger that updates a customer's account balance throughout the business day would be automatically driven through an automated source. A monthly trigger that initiates a message to begin the process of manually updating a legal notice would be a manual trigger. The updated legal notice may be assembled through existing outlines, templates, and borders, however, the content will need to be manually created by a legal professional.

In addition to analysis of its components, the document will be assessed as a whole, and one or more "triggers" will be assigned to the document as a whole. These triggers will drive a review cycle to ensure that the overall website does not contain misleading information, data that is no longer relevant, or hypertext-links to pages which no longer exist. The review will also ensure that nothing is displayed to the public that does not meet the formal and informal corporate standards.

The trigger may be driven by a date, such as 120 days after the document is published, or an event, such as a significant change in interest rates. Depending on the event initiating a trigger, notifications may be manual or automatic. Additional information on triggers is set forth herein below.

Once new outlines and templates are created and the content analyzed in step S9, the created information is ready for entry into the repository 60 in step S10. Extracts from, automated sources, or pointers to automated sources may be stored within the content management system. Content from non-automated sources may be migrated to the content management system in a process that may involve a web-crawler which migrates data from an existing web site. Manual data entry may also be required. Once incorporation of all content items for the web site is completed, the repository 60 will then have a master version of the site and all future updates would be made through the content management system.

Once incorporation is performed, website access is enabled in step S11. This involves linking the content with the a public or private website on the Internet or an Intranet. Prior to publishing content, a quality assurance check should be performed to ensure that static and dynamic information is properly displayed, and that hypertext-links are available and functioning.

Next, in step S12 the content is continuously maintained. As set forth above, each part of the site may have "triggers" defined that will initiate a content review to be performed manually or automatically. A content review may also be manually initiated due to feedback from website users, media attention, a request from the quality assurance group, or an employee identifying a concern related to the content. The review may result in one of three outcomes: no changes, changes required, or archiving content. If no changes are recommended, no further action will be taken until the next trigger initiates a content review.

Archiving components of the website is performed in step S14. Many websites have provisions for archiving content, such as old articles on a magazine site. Further, in accordance with the present invention, it is preferable to archive organizational and format components for possible future reuse.

Figure 7:
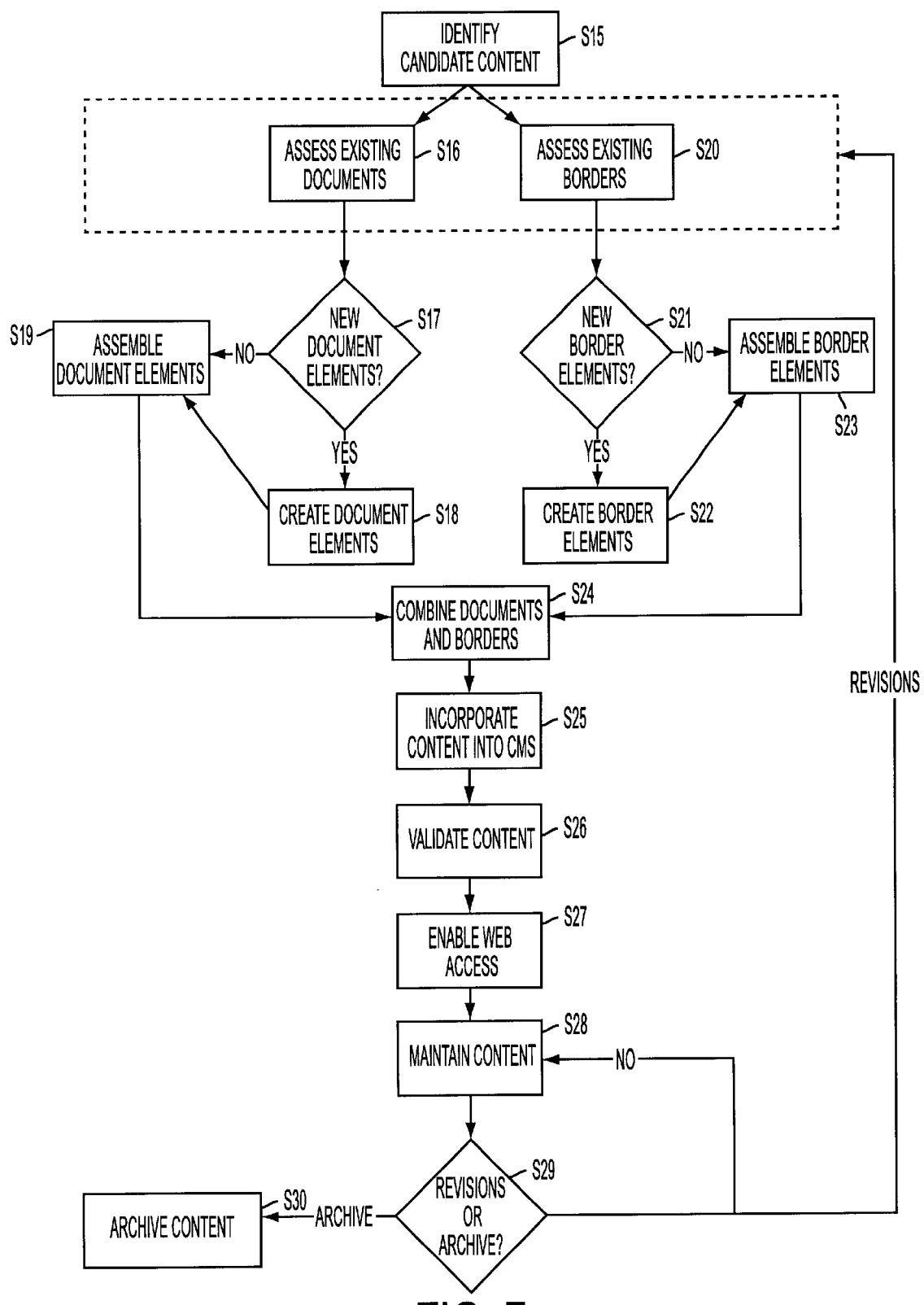
FIG. 7 is a flow chart for the migration of new content to the content management system in accordance with the preferred embodiment of the present invention.

FIG. 7 is a flow chart for the migration of new content to the content management system in accordance with the preferred embodiment of the present invention. The process starts in step S15 with the identification of candidate content.

Thereafter, in steps S16 and S20, existing documents and borders are analyzed to determine if they are applicable to the new content. In other words, a determination is made as to whether the document and border elements that have been cataloged in the repository 60 can be re-used in creating new documents. The outlines, sections, contents, templates, style groups, and styles are all candidates for re-use. If existing pieces can be re-used for the document, but in smaller portions than were originally cataloged, the existing elements may be divided. The related documentation and links to the website will then need to be updated.

For example, a three-paragraph section of an existing advertisement may be chosen as a single piece of content when it is first analyzed. When the next advertisement is created, only one of the paragraphs may be re-usable. To maximize re-use, the original three-paragraph piece of content will be divided into three separate pieces of one paragraph each. The data that described the original content and links to the website will be updated to reflect this change. Existing content may also be increased in size. For example, if an existing training document outline contains three major sections, and the new outline requires four major sections, the new optional section may be added to the outline without affecting the existing training documentation.

After this analysis, determinations are made in steps S17 and S21 as to whether new document elements (S17) or new border elements (S21) are required. If new elements, such as outlines, sections, contents, a template, style groups, or styles, are required they are created in steps S18 (document elements) and S22 (border elements).

In either event, the document elements are assembled in step S19 and the border elements are assembled in step S23. Thereafter, in step 524, the borders and documents are combined to create a complete set of content, organizational components, and format components for the page, set of pages or the site. The site organizational chart is updated during this step to reflect the relationship between the document and border(s) and its placement on the website. The site map is also updated to reflect the location of the document's pages on the website.

Next in step S25 the created documents and borders are incorporated into the content management system, i.e., entered into the repository 60. If all pieces of the document already exist within the content management system, no migration of data or interfaces will be necessary. If the new document contains data from automated sources that have not yet been linked to the content management system, an interface will need to be created to incorporate the data at assembly time. A specialized tool set may be required to perform the data movements, or a standard programming language may suffice. Such measures are entirely dependent upon the format and nature of the content, but within the ability of one of ordinary skill in the art.

It may be wise to validate the content prior to display on a website. This is performed in step S26. A validation process will ensure that nothing is displayed to the public that does not meet the formal and informal corporate standards. This will also serve as user acceptance testing for the interaction between the content source, the content management system, and the website. The validation process may include reviews for:

Legal and regulatory compliance;

Look and Feel;

Consistency of corporate image;

Grammar;

Fact-checking;

Interaction based on dynamic, static, or personalized data; and

Hypertext-links

The steps of maintaining the content (S28–S29) and archiving (S30) are as described above with respect to the process shown in FIG. 6.

Figure 8:
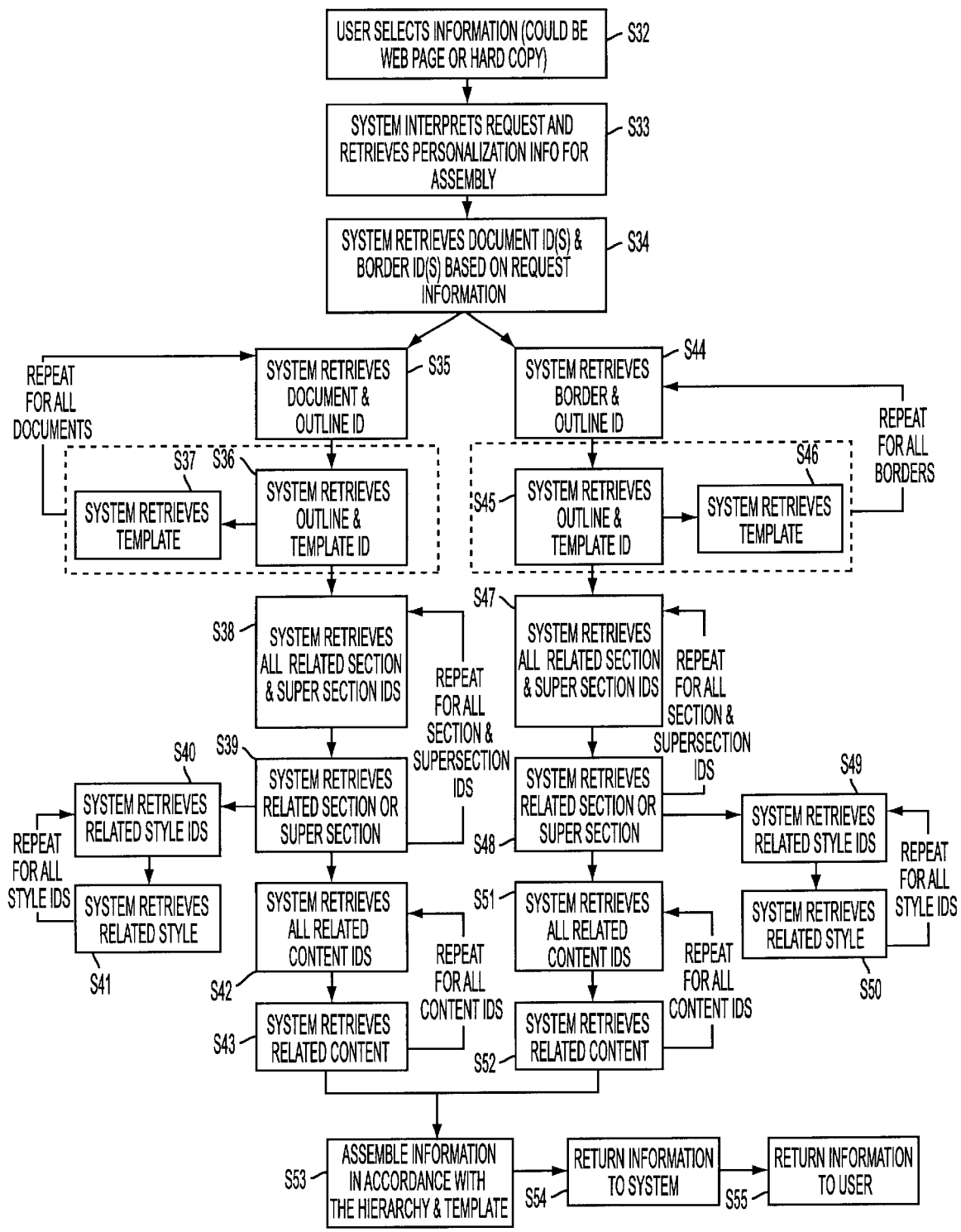
FIG. 8 is a flow chart showing the assembly procedure in the content management system in accordance with the preferred embodiment of the present invention.

FIG. 8 is a flow chart showing the assembly process in the web based content management system in accordance with the preferred embodiment of the present invention. The process starts in step S32 when a user requests information contained in the content: management system. Thereafter, in step S33, the system interprets the request and retrieves personalization information for assembly. The personalization information can retrieved based upon information from the user contained, for example, in cookies, passwords, or other types user identification.

Figure 9:
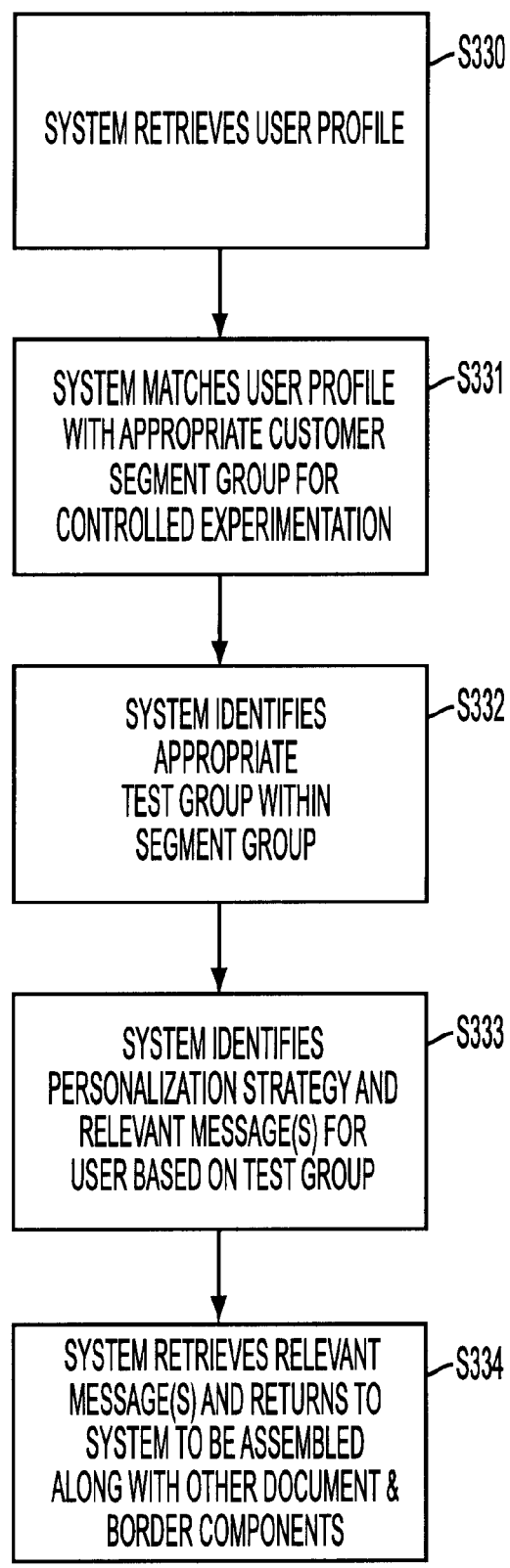
FIG. 9 is a flow chart of the personalization process referenced in FIG. 8.

FIG. 9 is a flow chart of the personalization process performed in step S33 in FIG. 8. The process shown in FIG. 9 is only one example of a method for providing personalized content. Other variations are possible within the framework of the content management system in accordance with the present invention. In step S330, a user profile is identified and retrieved using some form of user identification. The user profile can be as simple as the user's identity and as complex as the user's financial history with the site owner. Next, in step S331, the system uses the user profile to determine a customer's segment group. In this case the customer is the user requesting the page. A segment group is an optional grouping of customers based upon some objective measure such as profitability, tenure, relationship value, product usage, etc. . . . Segments can be defined with zero, one or more members. Once the segment group is identified, an appropriate test group is determined in step S332. A test group is a sub-set of a segment group to which exactly the same personalization treatment is provided. The use of test groups also allows a comparison of the results of the personalization process to be compared-across the various test groups. Accordingly, the use of test groups can be considered optional, but is shown here as a further example of the personalization that may be applied. Thereafter, in step S333, a personalization strategy is identified and relevant content, i.e. messages, images, programs, etc. are identified. Finally, in step S334, the relevant content is retrieved and returned to the content management system for assembly. As pages for display on the site are created in real time, a variety of dynamic processes can be implemented. The outline can be set to display optional content based on user ID and the previous page. For example, on a credit card site, users with delinquent accounts could receive optional borders calling this fact to their attention.

Referring back to FIG. 8, after the personalized content is retrieved, the process goes to step S34, and Document IDs and Border IDs are retrieved based on the requested information.

In steps 535 through S43 the system retrieves information related to the documents, while in steps S44 through S52 the system retrieves information related to the borders. As both process are similar only Step S35 through S43 (document retrieval) will be discussed.

In step S35 a document corresponding to a Document ID is retrieved and a related Outline ID is identified. Thereafter in step S36 the outline corresponding to the Outline ID is retrieved and a Template ID is identified. The template corresponding to the Template ID is retrieved in step S37. Steps S35 through S37 are repeated for each Document ID retrieved in step S34.

After all documents, outlines and templates are identified and retrieved the process goes to step S38 and all referenced sections are retrieved, along with any Super Section IDs. An analysis of optional sections is performed to determine if any optional sections are required. Next, in step S40 related Style IDs are retrieved and subsequently in step S41 the referenced styles are retrieved. In step S42 all content IDs are identified from the sections and in step S43 the related content is retrieved. As set forth above the process for retrieving the parts of the borders in steps S44 through S52 is substantially similar.

After all the parts of the personalized content, documents and borders are retrieved, the process goes to step S53 and the content is assembled into a whole document based on the hierarchy in the relevant outlines and the dictates of the templates and styles. The document is modified based upon the personalization information retrieved in step S33. The assembled document is then returned to the requesting system, such as the web server 12, in step S54. The requesting system in turn displays the assembled content to the user in step S55.

As noted above, content is stored in a format native to the creation tools 78. Prior to display on a web page (or other communication medium), the content may have to be translated to another format. This can be performed at a variety of junctures. In the example discussed above, the viewing application will typically be a web browser. The popular web browsers have translation capabilities and can handle some of the translations. For those formats that browsers cannot handle, the content can be passed to an auxiliary program prior to, or just after, assembly. Depending on the capabilities of the content management repository server 22, such tasks could be incorporated therein. Thus, any time the content management server 10 requested content, a check could be made as to whether the content was of a type typically requiring translation. If such translation is required, the content management repository server 22 could spawn a translation process prior to serving the content.

As set forth above, triggers are review criteria that instigate a review of document, borders, outlines, templates, or styles based upon some criteria. In other words, a trigger is a circumstance, which occurs that initiates either an automated or a non-automated review of components. Components include documents, borders, outlines, sections, content, templates, and styles. In essence, a trigger drives a review cycle. The purpose of the review cycle is to ensure that the information contained within the content management system does not contain misleading information, data that is no longer relevant, or links to information that no longer exists. The review will ensure that nothing is displayed to the public that does not meet formal and informal corporate standards. An event, a specified time frame, or a usage threshold may initiate an automated or a non-automated trigger.

A manual trigger is a circumstance that the content management system cannot anticipate or recognize when it has occurred. In these situations, a reaction to the manual trigger and updating information occurs as a natural part of the business process.

Automated triggers are circumstances that an automated system, such as the content management system, can recognize and anticipate. When an automated trigger occurs, the content management system will make the changes when it can. For instance, when the CEO's name is updated in a HR system, the content management system may be programmed to automatically return the correct CEO name by using a reference to the HR system to obtain the CEO name. When an automated trigger occurs for which the content management system cannot make the changes, a message may be sent, such as via e-mail, notifying a content specialist.

Examples of types of triggers are given in table 17 below:

TABLE 17

Trigger Examples

| Trigger Categories | Trigger Types | |
|---|---|---|
| | Manual | Automatic |
| Event | 1) A New CEO joins the company. References to the former CEO must reviewed to determine their suitability. 2) A CS Strategy Group develops a new classification for high value customers likely to leave the bank. Personalization rules and content will need to be developed and added. | References to the CEO in the Company Information section automatically change due to changes in the company's HR system. |
| Time Frame | Not applicable. | 1) All News Letter section items are reviewed when they are a month old. 2) A special marketing campaign to help customers pay off their holiday spending expires and the content needs to be updated accordingly. |
| Usage Threshold | A manager receives feedback that a Push Ad placed by a strategic partner has never been clicked on by anyone visiting the site. The manager reviews the as to determine why. | No users access a New Letter within six months, so the information is reviewed to determine if it is necessary to retain on the content management system. |

Figure 10:
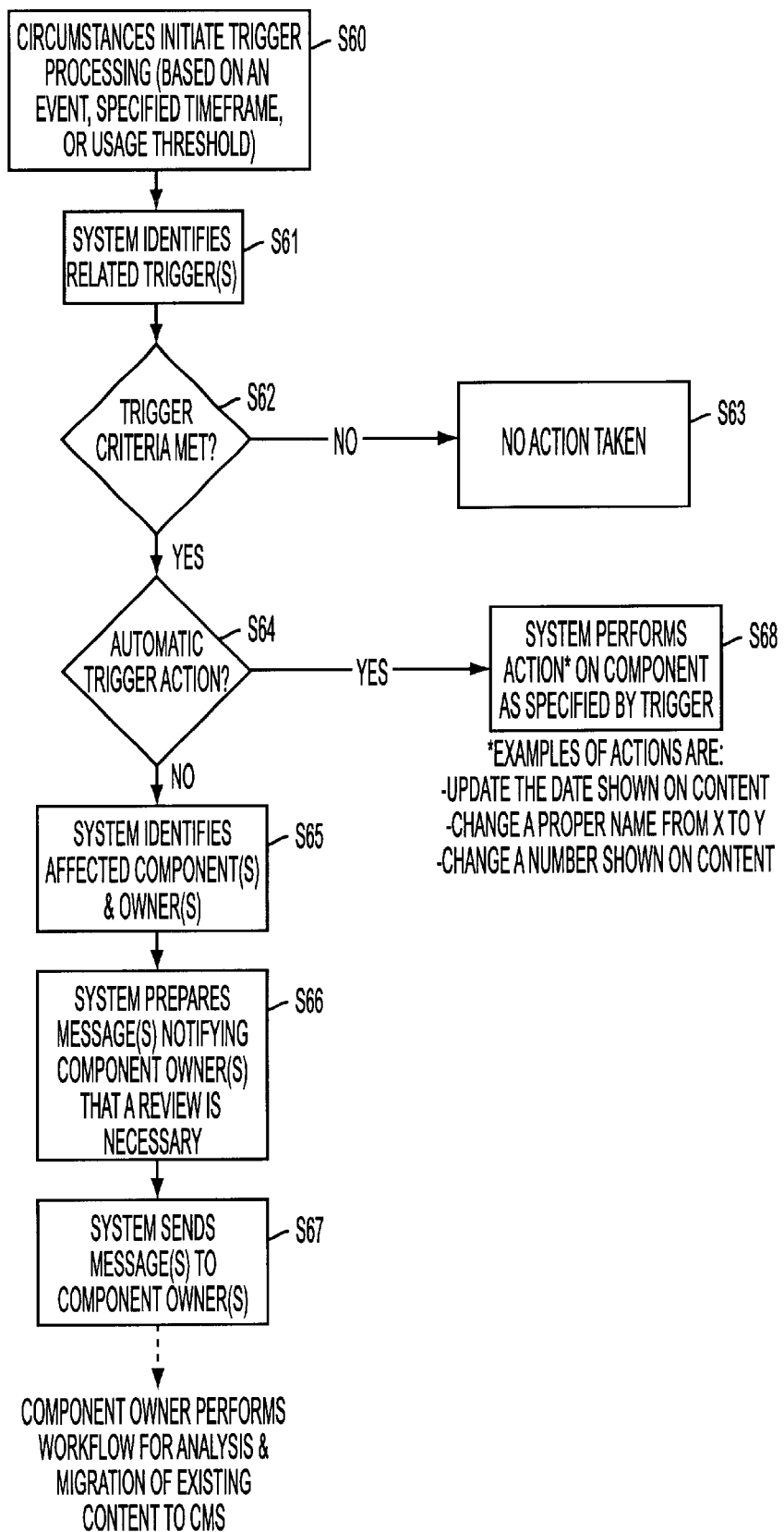
FIG. 10 is a flow chart showing the trigger procedure in the content management system in accordance with the preferred embodiment of the present invention.

FIG. 10 is a flow chart showing the trigger process in the content management system in accordance with the preferred embodiment of the present invention. The process is commenced in step S60 when an event occurs that activates trigger processing. One of ordinary skill in the art will recognize that various mechanisms may be used for activating trigger processing including lapse of time, some event or change in a flag, indicating for example some usage state (heavy or light traffic).

Next in step S61 relevant triggers are identified, such as by using a trigger list or database. As set forth above, trigger conditions can be stored with the components in the repository 60. Thereafter in step S62 each relevant trigger is analyzed to determine if the trigger condition is met. If the trigger condition is not met the process is completed (for that trigger) in step S63. Otherwise, a determination is made as to whether the trigger requires manual or automatic action in step S64.

If the trigger has an automated action associated therewith, such action is performed in step S68. Otherwise, the trigger requires manual intervention and the process goes to step S65 and the affected components and owners thereof are identified. In step S66 a message is prepared for the owner of the affected components. The message is then transmitted to the owner in step S67. Subsequently, the owner of the content reviews the content and determines whether any action is required.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A content management system for dynamically creating world wide web pages comprising:

a repository separately storing content for the web pages, an organization component of the content and a format component of the content; and a content management system server that receives a request from a web server for a web page and, in real time, accesses the organization component of the content and assembles a web page for the content based on the organization component in accordance with the format component of the content.

2. A content management system, as set forth in claim 1, further comprising:

a web server that requests web pages from the content management system server and serves the assembled web page to an end user.

3. A content management system, as set forth in claim 1, wherein the repository comprises:
- a database indexing the content, the organization component of the content and the format component of the content.

4. A content management system, as set forth in claim 3, wherein the database is organized such that each web site has at least one document and each document has at least one outline indicating a hierarchy of the content for the document and a format component of the outline.

5. A content management system, as set forth in claim 4, wherein the at least one outline references sections which in turn reference other sections or pieces of content along with an optional format component.

6. A content management system, as set forth in claim 3, wherein the database stores triggers which indicate a condition for which an action is defined.

* * * * *